United States Patent [19]

Webster et al.

[11] Patent Number: 4,815,067
[45] Date of Patent: Mar. 21, 1989

[54] OPTICAL ROTARY HEADWHEEL TAPE RECORDING SYSTEM

[75] Inventors: Elizabeth A. Webster, Hayes; John C. Newell, North Holmwood; Brian J. Baker, Burnham; Paul E. Claes, Hayes, all of England

[73] Assignee: Thorn EMI plc., London, England

[21] Appl. No.: 104,024

[22] Filed: Oct. 5, 1987

[30] Foreign Application Priority Data

Oct. 6, 1986 [GB] United Kingdom ............... 8623968
Sep. 5, 1987 [GB] United Kingdom ............... 8720922

[51] Int. Cl.$^4$ .............................................. G11B 7/12
[52] U.S. Cl. .................................................. 369/97
[58] Field of Search ............... 369/97, 45, 46, 100, 369/112; 360/114

[56] References Cited

U.S. PATENT DOCUMENTS

| | | | |
|---|---|---|---|
| 3,314,075 | 4/1967 | Becker et al. | 369/97 |
| 4,525,828 | 6/1985 | Higashiyama et al. | 369/97 |
| 4,633,455 | 12/1986 | Hudson | 369/97 |
| 4,669,070 | 5/1986 | Bell | 369/97 |

OTHER PUBLICATIONS

"Principles of Optical Disc Systems", by G. Bouwhuis, et al., Adam Hilger Ltd., 1985, pp. 136-143.

Primary Examiner—Donald McElheny, Jr.
Attorney, Agent, or Firm—Fleit, Jacobson, Cohn & Price

[57] ABSTRACT

A helically scanned optical tape recording and replay system has a rotating drum with a galvanometer mirror for controlling the tracking of a number of write and read light beams during recording and replay. Dynamic focussing of the beams on the recording medium is controlled by means of a voice-coil actuator operating on a lens situated outside the drum. An optical rotator is provided through which the write and read beams pass following beam combinations, the optical rotator being driven by a motor to rotate at half the rotational velocity of the drum, and thereby present an image to the optical tape which rotates synchronously with the drum.

13 Claims, 6 Drawing Sheets

PART SECTION ON A-A

OPTICAL ROTARY HEADWHEEL TAPE RECORDING SYSTEM

The present invention relates to helical scan optical systems for the recording and/or playback of data.

U.S. Pat. Specification No. 4525828 discloses a helical scan optical recording system for data, in which system the writing beam is focussed by controlling the final objective leans which is located in the drum.

The present invention provides a system for the optical recording and/or playback of data, the system comprising:

means to pass tape material, suitable for data storage in the form of indicia of differing optical characteristics to those of the tape material, over a drum to effect a substantial circumferential wrap thereof;

means to supply light for direction onto a portion of the tape material at the wrapping location of the drum to effect helical scanning of that portion of tape material;

means to effect dynamic focussing of the light, output from the light supply means, onto the portion of the tape material at the wrapping location, the focussing means being positioned in the light path intermediate the light supply means and the drum.

In this way, the focussing operation of the system is substantially unaffected by any centrifugal forces caused by rotation of the drum.

Preferably, the focussing means comprises means to alter the separation between a pupil-relay pair of lenses. Thus the number of components can be maintained low with a view to keeping the cost of the system low. Advantageously, the separation means comprises a voice-coil actuator with a focussing lens which acts as one of the pupil-relay pair of lenses.

Preferably, the focussing means is operable in dependence on an output from means to monitor for light subsequent to a helical scan. Advantageously, the monitor means comprises an array of detectors, which may be used in the read mode for the production of a read output signal.

Preferably, there is provided, in use, an air bearing intermediate the drum and the portion of tape material at the wrapping location.

Advantageously the tracking means comprises a galvanometer pivoted mirror located at the drum. Alternatively, the tracking means comprises a non-pivoted mirror at the drum, which mirror is movable in a direction along the light path.

Preferably, the system comprises means to provide a plurality of light beams to effect the writing of indicia designating data onto the tape material and/or means to provide a plurality of light beams to effect the reading of indicia designating data on the tape material, and means to effect relative rotation of the light beams about an axis parallel to their path, the rotation means being located in the light path intermediate the light supply means and the drum and having a rate of rotation in dependence on that of the drum.

Clearly, the indicia on the tape material to designate data can be of any appropriate form, for example they may constitute transparent regions on a reflective or non-transmissive tape, or they may be reflective or non-transmissive regions on a transparent tape.

The present invention also provides equipment for the helical scan recording, and/or reading, of data on optical tape, the equipment being for use in the system as herein defined.

According to another aspect, the present invention also provides a method for the optical recording and/or playback of data, the method comprising:

passing tape material, suitable for data storage in the form of indicia of differing optical characteristics to those of the tape material, over a drum to effect a substantial circumferential wrap thereof;

outputting light from a means to supply light for direction onto a portion of the tape material at the wrapping location of the drum to effect helical scanning of that portion of tape material; and effecting dynamic focussing of the light, output from the light supply means, onto the portion of the tape material at the wrapping location, the focussing means being positioned in the light path intermediate the light supply means and the drum.

Preferably, the focussing step includes altering the separation between a pupil-relay pair of lenses.

Preferably, the method comprises monitoring for light subsequent to a helical scan and operating the focussing means in accordance with the results of the monitoring step.

Preferably, the method comprises providing an air bearing intermediate the drum and the portion of tape material at the wrapping location.

Preferably, the method comprises tracking, at the drum, the light for scanning of the portion of tape material at the wrapping location.

Preferably, the method comprises providing a plurality of light beams to effect the reading of indicia designating data on the tape material, and effecting relative rotation of the light beams about an axis parallel to their path, the rotation being effected in the light path intermediate the light supply means and the drum and having a rate of rotation in dependence on that of the drum.

The invention will now be described, by way of example with reference to the accompanying drawings in which.

Figure 1:
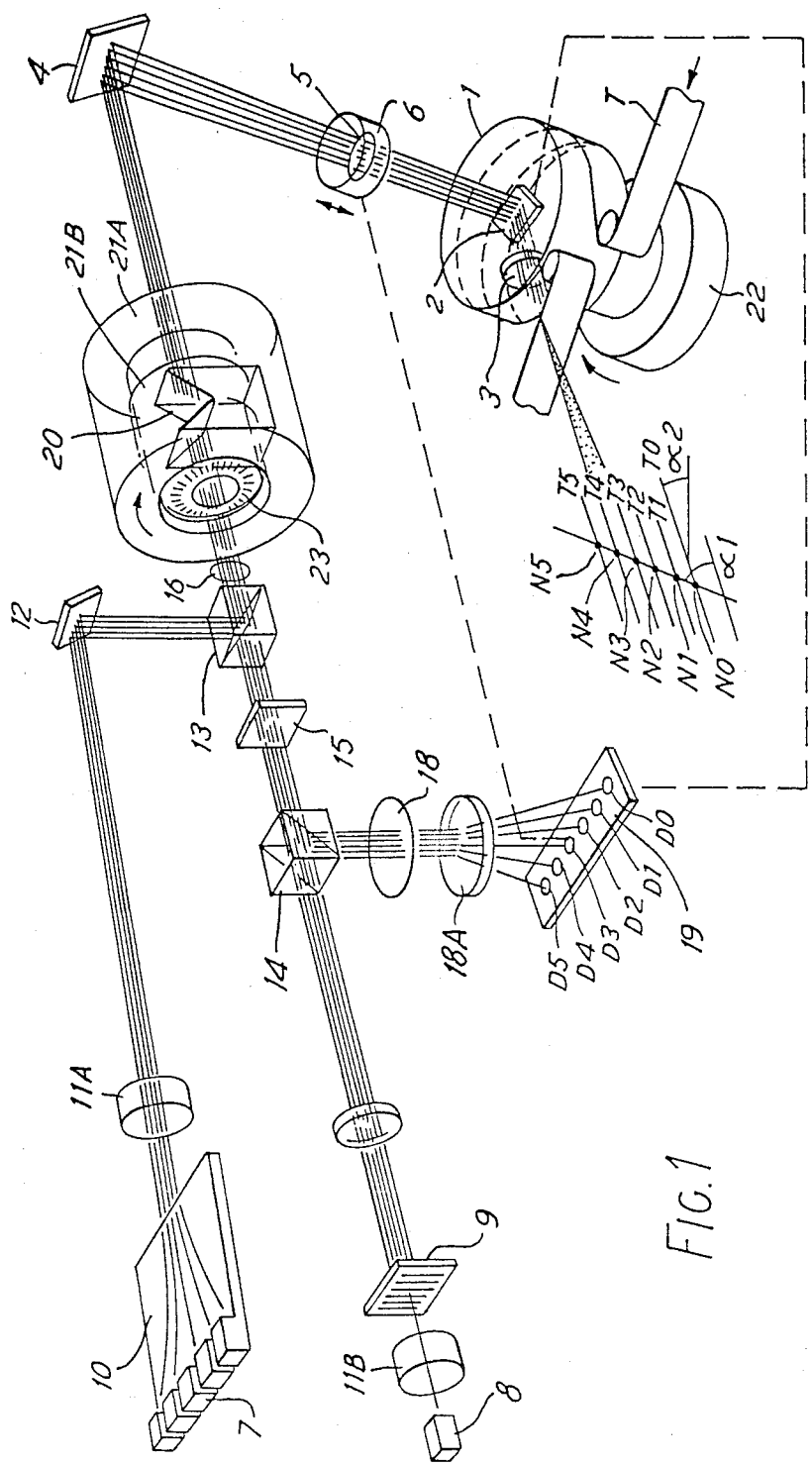
FIG. 1 is a schematic diagram showing the basic optical and mechanical components of a multiple beam optical recording and replay system.

Referring to FIG. 1, a rotating drum 1 is constructed such as to include a galvanometer pivoted mirror 2 and a final objective lens 3 fixed inside the drum. The drum has a diameter of the order of 110 mm and during recording or replaying rotates at a substantially constant rotational velocity, typically within the range 50 to 150 revolutions per second, to have a peripheral velocity of typically 17 to 52 meters per second. A reflective optical recording tape T follows a helical path around the drum with a substantially omega-shaped 340° tape wrap at a substantially constant linear velocity which typically lies within the range 30 to 300 mm per second. The tape may be a base body on which is a thermally sensitive layer (such as pthalocyanine dye) or an ablative metal film (such as tellurium). Operating at such speeds, an air bearing is formed at the interface between the tape and the drum, and in a practical system some variation in separation between the facing surfaces of the tape and drum is likely to be encountered due to small variations in tape tension, tape speed and drum rotational speed. Write and read laser beams are directed from a fixed mirror 4 through a focussing lens 5 on to the galvanometer mirror 2 and are deflected through the final objective lens 3 on the drum and on to the surface of the optical tape T. Dynamic focus control is provided to ensure that each write and read beam may be focussed to form a diffraction-limited spot of, typically, less than one micron diameter on the tape surface while undergoing the abovementioned variations in tape to drum separation, this being achieved by the position of the focussing lens 5 being servo-controlled by means of an actuator of the voice-coil type 6. Voice-coil type actuators have hitherto been used in the focus control of the final objective in optical disc systems, and suitable constructions are described, for example in "Principles of Optical Disc Systems" by G. Bouwhuis et al, Adam Hilger, 1985, especially pages 136 to 142, by which reference the subject-matter therein is duly incorporated within this present patent specification. The drum may be used in a reel-to-reel type tape transport or with a cassette type tape transport, such as are known from helical scan magnetic tape technology.

Considering now the optical arrangements in detail, a linear array 7 of N independently modulated 850 nm lasers is provided in order that N information tracks may be simultaneously written on the tape by means of N co-planar write beams. A single 780 nm read laser 8 is provided and the read laser beam, following collimation by a collimator lens 11B, is split into N+1 co-planar beams by means of a beam splitting grating 9 in order that N+1 information tracks may be simultaneously read. FIG. 1 shows an arrangement for N=5, while, in practice, N may typically lie between 2 and the order of 50. The write lasers would normally all be simultaneously energised and independently modulated during a writing, i.e. recording operation, and the read laser would be energised during a read, i.e. replay, operation. If the recording medium is of the type which requires processing between a writing and a reading operation, such as photo-resist or other photographic media, then the write and read lasers would not normally be energised simultaneously, and writing and reading could not be simultaneously carried out.

If the medium is of the type which permits instant replay, such as thermally absorptive ablative thin films or dyes, then the write and read lasers may be simultaneously energised to permit check-reading during a writing operation in a Direct Read During Write (DRDW) mode. The optical system will now be described for the DRDW mode of operation.

The write and read lasers have different optical wavelengths, the wavelength of each writing laser typically being 850nm and the wavelength of the read laser typically being 780 nm. The writing laser beams are concentrated and collimated by means of a concentrator 10 and a collimating lens 11A to provide five equi-spaced co-planar light beams which are deflected by means of a fixed mirror 12 to enter a dual prism beam combiner 13. The read laser beam, which is of lower power than the write beams, is collimated and split into six co-planar beams which are directed through a polarising beam splitter 14 and quarter-wave plate 15 to the beam combiner 13. The five read beams and the six write beams are directed through an optical image rotator 20 to the fixed mirror 4 and deflected on to the galvanometer mirror 2 in the rotating drum and focussed to form diffraction limited spots on the surface of the recording medium. Lenses 16 and 5 form a pupil-relay pair of lenses through which the write and read beams all pass and a fixed lens 17 is provided between the grating 9 and beam splitter 14. The optical system is arranged such that, following beam combination, the five in-line writing spots N1 to N5 coincide with five of the six reading spots N0 to N5, as shown in expanded inset in FIG. 1. Each writing spot is of sufficient intensity to form an ablated recorded pit in the medium, while the read spots are of lower intensity. The read beams are reflected from the medium back through the optical system to the polarising beam splitter where they are deflected, in known manner, through an interference filter 18 and are focussed by means of lens 18A on to an array 19 of six in-line photo-diodes D0 to D5. The interference filter ensures that only light reflected from the reading laser, and none from the writing lasers, is sensed by the photo-diode array.

It will be appreciated by those skilled in the art that if no optical rotator were provided, the system could only operate satisfactorily with a single write beam or a single read beam approaching the galvanometer mirror along the drum axis. Any off-axis beams would give rise to a varying separation of tracks on the recording mediums, due to the rotation of the galvanometer mirror 2 in the drum. A solution to this problem is provided by suitably rotating the effective object source for both write and read beams. Optical rotation devices which, when rotated produce a rotation of an image about an optical axis are well known and are, for example, the Dove, Schmidt, Abbe, Vee-block and Pechan rotators, each of which, when rotated, will provide an image of a stationary object which rotates at double the rotational speed of the rotator. An optical rotator 20 is provided through which the write and read beams pass following beam combination. The optical rotator is driven by a motor 21A and 21B to synchronously rotate at half the rotational velocity of the drum, and thereby present an image to the recording medium which rotates synchronously with the drum. The focussed image to the medium corresponding to the read beams takes the form of the six (N+1) in-line diffraction limited spots N0 to N5 shown in the inset of FIG. 1. The five (N) write beams are focussed to spots which superimpose with the five read beam spots N1 to N5. During a writing operation, five parallel tracks T1 to T5 lying at an angle $\alpha 1$ to the line of spots are recorded on the tape, while in a reading operation an adjacent previously recorded track T0 may be read by the reading spot N0 for track position control. The galvanometer mirror 2 is held in a fixed position during a write or read sweep and the recorded tracks lie at a small angle to the tape edge, known as the sweep angle $\alpha 2$, which is governed by the slope of the tape helix around the drum.

If a rotator were not provided, the angle $\alpha 1$ would vary during a scan, due to image rotation caused by the rotation of the galvanometer mirror, and the spacing between the tracks on the tape would consequently vary in an unacceptable manner. This variation is corrected by the provision of the optical rotator 20, suitably synchronised to half the rotational velocity of the drum such that the image rotation caused by the rotator will offset the image rotation caused by the drum, resulting in an effectively constant angle $\alpha 1$ and a constant track to track spacing.

In a reading operation, the read beams reflected from the tape surface pass through the drum in the reverse direction to the incident beams before being deflected by the polarising beam splitter 14 towards the array 19 of sensing diodes and the optical rotator 20 again corrects for image rotation caused by the rotation of the galvanometer mirror, thereby ensuring that alignment of the reflected beams with their associated sensing diodes is preserved.

The optical rotator 20 is disposed between the lenses 16 and 5, which form a pupil relay pair, thereby enabling the voice coil controlled focussing lens 5 to be placed close to the drum periphery. FIG. 1 shows the rotator placed between the lens 16 and the fixed mirror 4; the rotator could alternatively be placed between the fixed mirror and the focussing lens 5. The light beams in such positions are likely, in practice, to be markedly convergent or divergent, although, for schematic simplicity, they are shown as parallel in FIG. 1. It is therefore desirable that the entry and exit faces of the rotator lie perpendicular to the direction of rotation, and suitable rotators include the Vee-block, Abbe, and Pechan types. The more commonly used Dove and Schmidt rotators have tapered entry and exit faces and, as such, are less suitable for use with the present invention.

The embodiment of the invention shown in FIG. 1 uses a well-known polarising beam splitting system for the read beams whereby the incident and reflected read beams are polarised. The incident beam is first linearly polarised by the polarising beam splitter 14 and then converted to circular polarisation by the quarter-wave plate 15. The reflected beam remains circularly polarised in its return path until it is converted back to linear polarisation by the quarter-wave plate, with polarisation orthogonal to the polarisation of the incident beam, and thence deflected by the polarising beam splitter towards the diode array. In such a system, the incident and reflected read beams are ideally circularly polarised when they enter and leave the rotator. It is preferable that internal reflections within the rotator should not introduce undesirable polarisation effects which would adversely affect the circular polarisation in order to avoid excessive cyclic amplitude modulation of the detected replay signals. The above-mentioned types of optical rotator, in conventional form, generally comprise one or more suitably shaped optical prisms and the light path through such rotators has an odd number of reflections. It is common practice for some or all of the reflecting surfaces in this light path to be totally internally reflecting. It is well-known that light undergoing total internal reflection is generally subject to marked polarisation effects, while light reflected from metal surfaces is generally much less subject to such effects.

Figure 2:
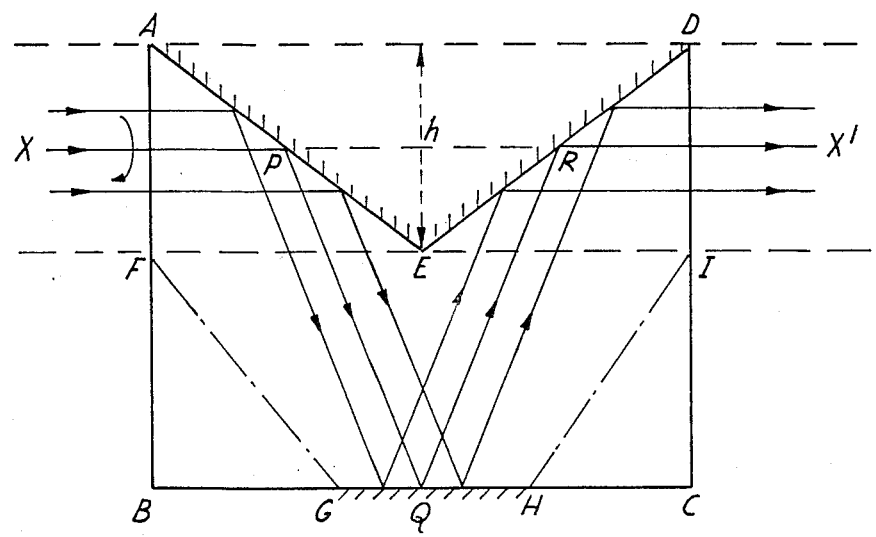
FIG. 2 is a side view of an optical image rotator.

A side view of a rotator suitable for use with polarised read beams is shown in FIG. 2. The rotator takes the form of a single prism having only three reflecting surfaces, all of which are metallized, and has no totally internally reflecting surface. The prism may take the form of a Vee-block, having a rectangular cross-section ABCD with a V-shaped cut AED in its upper surface. The depth of the V cut, h, is typically one half the height AB of the block and the block rotates about the axis XX'. The surfaces AE and ED and the central region GH of the lower surface of the block are metallized with, e.g., evaporated silver. One or more light beams having a central axis along the rotational axis XX' enter the face AB of the prism and are reflected by the three metallized faces to emerge from the prism with their central axis unchanged. As the prism rotates, the image created by the emergent beams will rotate about the axis XX' at twice the rotational velocity of the prism in known manner. The prism may alternatively have the geometry of an Abbe type rotator, such as is defined by the section AFGHIDE of FIG. 2. While FIG. 2 shows only three beams entering and leaving the prism, the axis of rotation XX' would normally correspond with the mid-point of the N+1 planar read beams in the above-described optical reading system.

While the use of a polarising beam splitter and quarter wave plate is advantageous in preventing reflected read beams from being partially directed towards the read laser, such polarising devices are not essential and known forms of optical replay device, such as many Compact Disc players, for reasons of economy, operate with a non-polarising half-silvered mirror in place of the polarising beam splitter and use no quarter-wave plate. Such non-polarising read optics could be used with the present invention, in which case a conventional rotator such as a conventional Vee-block, an Abbe, or a Pechan type, having one or more total internal reflections could be used without causing undesirable cyclic amplitude modulation. A Pechan rotator would have the advantage of axial symmetry. The rotator would normally be mounted in a hollow shaft 21A which is driven by a motor 21B to rotate about the axis XX'.

Control leads (not shown) are provided within a hollow shaft 22 supporting the drum for controlling the deflection of the galvanometer 2 and hence controlling the track positioning during write and read operations. The leads communicate via slip rings or inductive couplers with track positioning control lines which may be externally energised to select particular indexed track positions, and one or more of the diodes D0 to D5 communicate with the galvanometer control leads for the servo control of track position in known manner. In the preferred embodiment shown in FIG. 1, diode D0 communicates with the galvanometer, and during a first write-read scan, a first band of five tracks T1 to T5 would be written, to be simultaneously read in a DRDW mode by diodes D1 to D5. In a second scan, the galvanometer would be indexed such that the reading light spot N0 is superimposed on the just written track T5 and during the second scan, the diode D0 senses this track while a second band of tracks T1 to T5 are written and sensed by the diodes D1 to D5. The signal from diode D0 is processed to dynamically control the galvanometer deflection such that the first recorded track T5 is precisely followed.

One or more of the diodes D1 to D5 communicates with the voice coil actuator 6 to dynamically control the position of the final pupil relay lens 5 in order that the associated light spot on the tape remains in focus when variations in spacing between the drum and the tape occur, as hitherto described.

The circuitry and mechanisms used for the servo control of focussing and the indexing and servo-control of track position during writing and reading are generally similar to the methods used in optical disc recording technology, such as are described, for example, in the above-mentioned book by Bouwhuis et al, and will not be described further.

Figure 3:
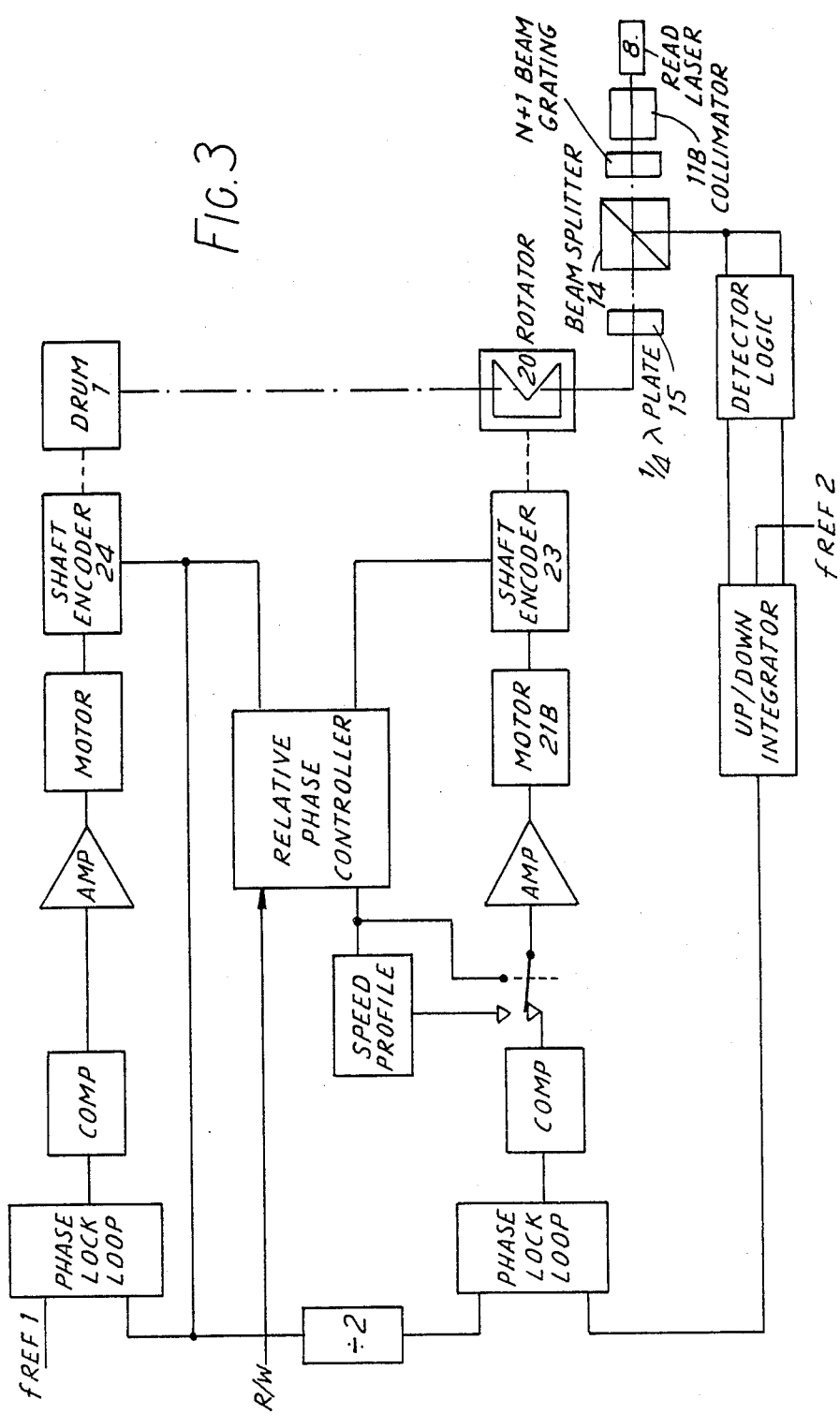
FIG. 3 is a block diagram showing a control system for use with the system of FIG. 1.

A suitable control system for implementing the control of rotational velocity and relative phase of the drum and optical rotator in a multiple beam recording and replay is shown in FIG. 3. The hollow drive shafts associated with the optical rotator and the drum are each provided with a shaft encoder, 23 and 24 respectively. The drum rotational velocity is first defined by an input signal at a constant reference frequency $F_{ref\,1}$ and, via a first phase locked loop circuit associated with the drum shaft encoder 24, a signal representing the drum rotational velocity is divided by two in frequency and controls the rotator rotational velocity. During reading, read signals from detectors D0 and D5 corresponding to the outer tracks T0 and T5 are fed via detector logic and suitable up/down integrating logic, (clocked at a constant frequency $F_{ref\,2}$) into a second phase locked loop, the output of which provides a drive signal to the motor driving the rotator. Signals from the drum shaft encoder and the rotator shaft encoder are fed to a relative phase controller whereby the required control of phase between the drum and rotator motors is maintained.

Other embodiments of the invention will be apparent to those skilled in the art. For example, a single write channel may be used with simultaneous read-out of multiple read channels. Alternatively a single high power write laser could be used whose output beam is split into N multiple beams which are independently modulated.

This embodiment of the present invention provides a multiple beam helical scan optical recording and replay system whereby a plurality of tracks can be accessed simultaneously during recording and/or during replay, thereby increasing the data throughput rate. This embodiment also provides a helical scan optical recording and replay system which is capable of Direct Read During Write (DRDW) operation.

Figure 4:
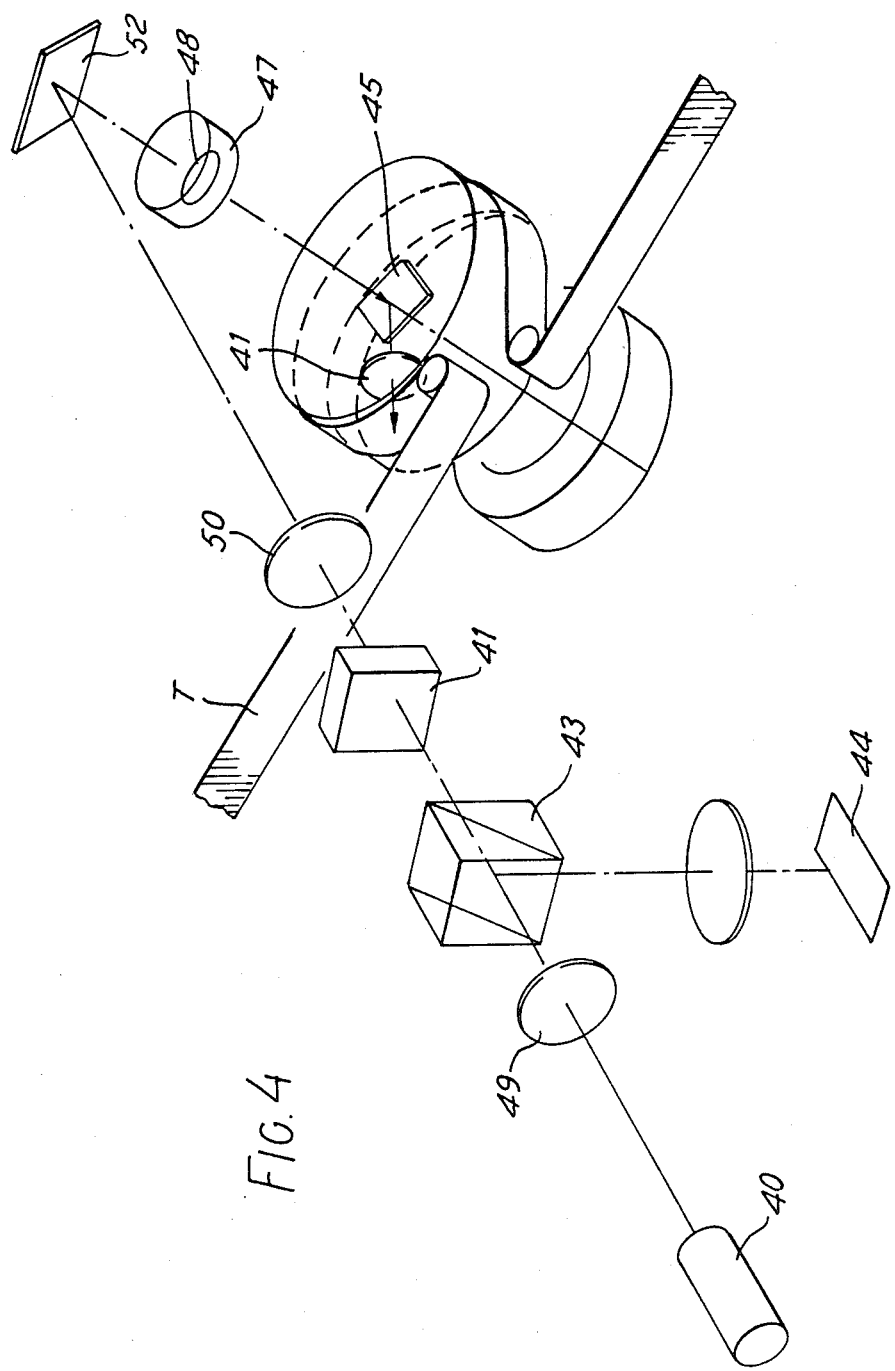
FIG. 4 is a schematic diaqram of another system embodying the present invention.
Figure 5A:
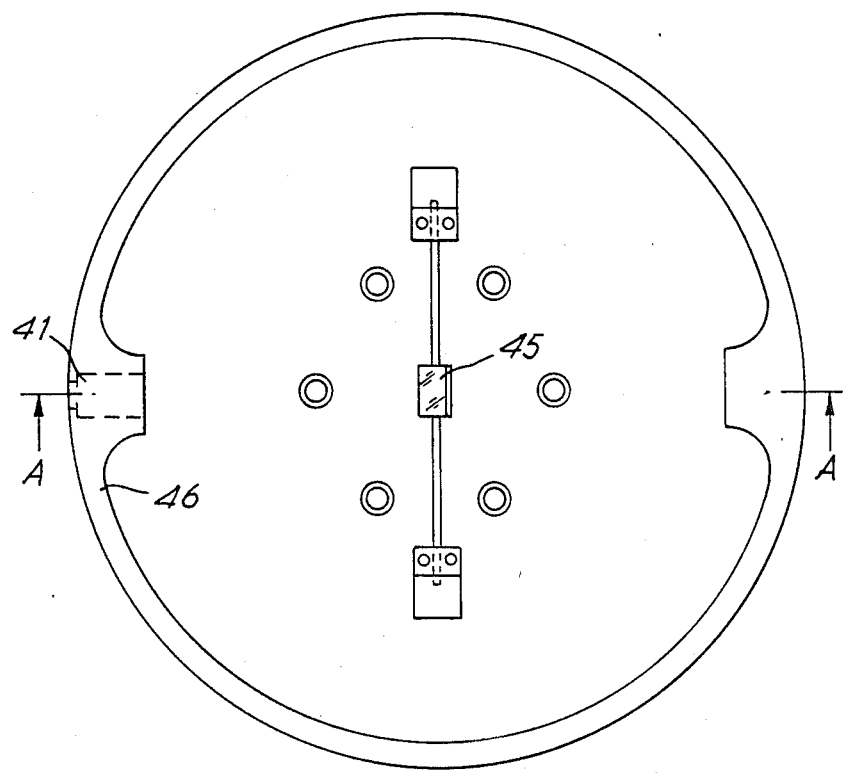
FIG. 5(A) shows in plan view, the drum of FIG. 4.
Figure 5B:
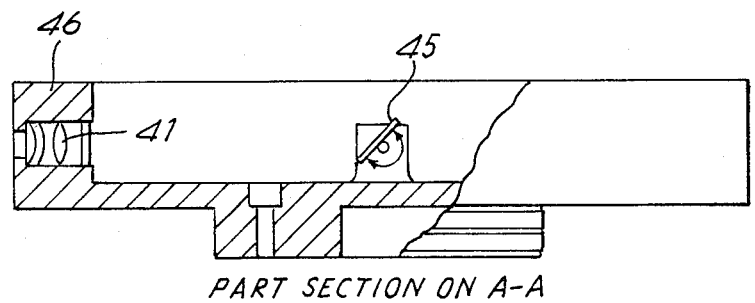
FIG. 5(B) shows a part section viewed on arrows A—A of FIG. 5(A)

FIGS. 4 and 5(A) and 5(B) show an alternative, simpler, single-track system embodying the present invention, which has a single laser 40 with two light output levels, one for the writing of data and the other for the reading of data. Such a system may be used in a read-only mode with a low power laser.

In operation of the optical recording system of FIGS. 4, 5(A) and 5(B), light from a semi-conductor laser 40 is imaged through a final rotating imaging objective lens 41, on to a thermally sensitive recording medium in the form of optical tape T. The medium for write and read operations may suitably be an ablative metal film such as telluriam or a thermally sensitive dye such as pthalocyanine. The medium for write only, or for read only, operations may be a photoresist film which is suitably chemically processed between write and read operations. The operation of the writing mechanism is such that an energy pulse from the laser 40 operating at the writing level ablates an area of the heat sensitised area on the base film thus forming a pit. Detection optics, formed a quarter wave plate 42 and a polarising beam, splitter prism 43, image the reflected beam onto a detector array 44, which provides a read output signal, a focus-error signal and a tracking error signal. Electronic detection methods, in similar fashion to those of optical disc technology, are then applied to the diode signals thus forming a control signal which is used to control the galvonometer 45 situated in the rotating drum 46. Other electronic detection methods are possible, for example wobble spot scanning whereby a single beam is mechanically modulated by the galvo at a high frequency (>60 kHz) and the detected beam is signal processed so as to provide an error control signal.

The system uses a voice coil actuator 47 and lens 48 operating on the focus-error signal for the dynamic focussing of light onto tape T. Also provided are lenses 49, 50, 51 and a fixed mirror 52 for the appropriate guiding of the light beams.

With helical scan, drum speed changes alter the hydrostatic pressure in the drum/tape gap and thus change the head/tape gap. Without any mechanical correction methods to adjust this fluctuation, data corruption occurs as signal-to noise ratio is directly related to the head/tape gap.

With optical recording there is a requirement for a definable gap between the final imaging lens and the recording media. With optical disc technology this is achieved by driving the final imaging objective with a magnetically driven voice coil. In order to protect the optical recording layer, a transparent plastics protective layer is coated onto the media and the laser beam is imaged through this layer. Dust and other impediments are out of focus and thus their effect on signal to noise is reduced. With optically sensitive media, the requirements for protection are greatly reduced as the protection is achieved in the same manner as magnetic recording tape. The media may be in a cassette and layer wound. Consequently it is only necessary to control the atmosphere during recording and reading and maintain out of contact imaging, in order to protect the media. With the helical optical recording head these conditions are immediately met. The drum generates a definable air bearing that is directly related to the rotational velocity. Consequently variations in the drum//tape gap, and hence the working distance can be compensated for by a lens elsewhere in the system. In order to reduce rotational forces, this lens is placed directly above the entrance orifice to the drum.

By using the above arrangement it is now possible to vary data rate in both the write and read cycle, without recourse to electronic methods of storage. Drum rotational speed variations can be compensated by a combination of galvo tracking in order to accommodate track angular variations and a focussing voice coil can compensate for variations in objective working distances generated by variations of the hydrostatic pressure.

Figure 6:
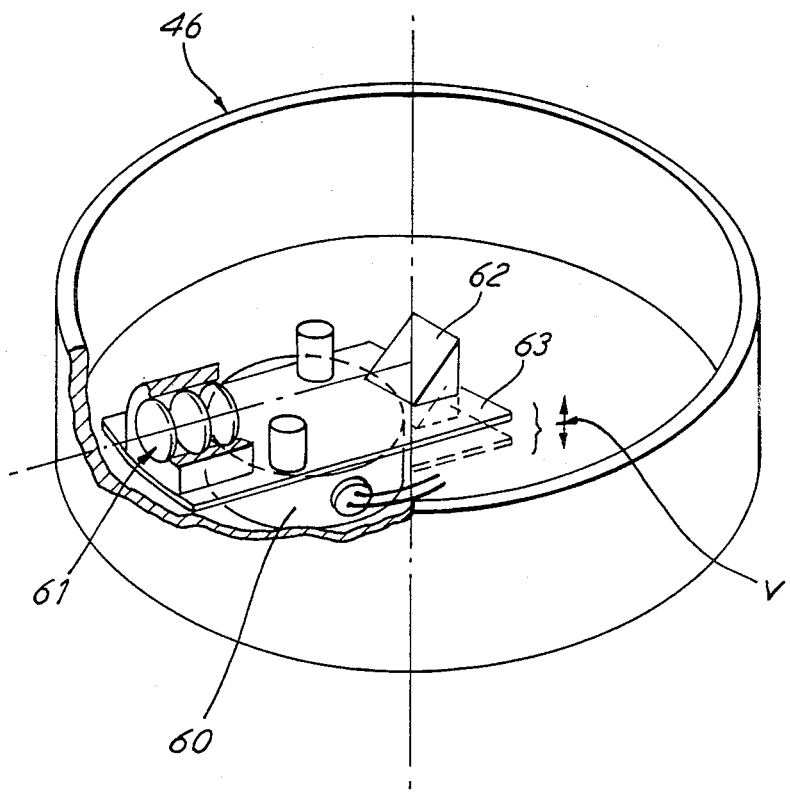
FIG. 6 shows an alternative form of drum.

Either embodiment illustrated above may be modified such that the drum is provided, in place of the galvanometer mirror, with an objective lens and non-pivoted mirror, both movable synchronously along the light path as is disclosed in FIG. 6. Thus a magnetic force transducer or piezo-electric force transducer 60 for tracking in the direction V is used to position the final imaging objective lens 61, under the influence of the electronic decision error signal that previously drove the galvonometer. Here an error signal is used to position the objective onto the required track position, determined from either an external command i.e. addressing a pre-selected track or a signal determined from an individual track error position. A prism mirror 62 is provided fixed on the mounting 63 for lens 61. Smaller optics results from the vertical movement of the final imaging objective lens rather than the steering of the beam entering the final imaging objective.

Thus the helically scanned optical tape recording and replay system shown in FIGS. 4, 5(A) and 59B) has a rotating drum with a galvanometer mirror for controlling the tracking of a single light beam during recording and replay, and dynamic focussing of the beam on the recording medium being controlled by means of a voice-coil actuator operating on a lens situated outside the drum. The illustrated system, while capable of operation at a high recording density, is limited to the use of a single write or read beam which enters the drum along the drum axis, and any attempt to simultaneously record or replay with a plurality of beams may result in a rotation of the focussed image on the tape surface, thus causing an undesirable variation in track to track spacing.

The invention provides a system with the data density and signal to noise advantages of optical disc systems with the flexibility and storage volumetric efficiency of tape systems. The system can be utilised to an advantage when huge archieval stores are necessary. It also provides an advantage to Optical Juke Boxes where a large number of discs can be stored on a carousel. With optical tape systems there is an inertia gain since tape has distinctly less mass than a disc transporter in a carousel.

We claim:

1. A system for the optical recording and/or playback of data, the system comprising:
    means to pass tape material, suitable for data storage in the form of indicia of differing optical characteristics to those of the tape material, over a drum to effect a substantial circumferential wrap thereof;
    means to supply light for direction onto a portion of the tape material at the wrapping location of the drum to effect helical scanning of that portion of tape material;
    means to effect dynamic focussing of the light, output from the light supply means, onto the portion of the tape material at the wrapping location, the focussing means being positioned in the light path intermediate the light supply means and the drum.

2. A system according to claim 1, wherein the focussing means comprises means to alter the separation between a pupil-relay pair of lenses.

3. A system according to claim 1, wherein the focussing means is operable in dependence on an output from means to monitor for light subsequent to a helical scan.

4. A system according to claim 1, wherein there is provided an air bearing intermediate the drum and the portion of tape material at the wrapping location.

5. A system according to claim 1, wherein the drum incorporates means to effect tracking of the light for scanning of the portion of tape material at the wrapping location.

6. A system according to claim 1 comprising means to provide a plurality of light beams to effect the writing of indicia designating data onto the tape material and/or means to provide a plurality of light beams to effect the reading of indicia designating data on the tape material, and means to effect relative rotation of the light beams about an axis parallel to their path, the rotation means being located in the light path intermediate the light supply means and the drum and having a rate of rotation in dependence on that of the drum.

7. Equipment for the helical scan recording, and/or reading, of data on optically sensitive tape, the equipment being for use in the system of claim 1.

8. A method for the optical recording and/or playback of data, the method comprising:
    passing tape material, suitable for data storage in the form of indicia of differing optical characteristics to those of the tape material, over a drum to effect a substantial circumferential wrap thereof;
    outputting light from a means to supply light for direction onto a portion of the tape material at the wrapping location of the drum to effect helical scanning of that portion of tape material; and
    effecting dynamic focussing of the light, output from the light supply means, onto the portion of the tape material at the wrapping location, the focussing means being positioned in the light path intermediate the light supply means and the drum.

9. A method according to claim 8 wherein the focussing step includes altering the separation between a pupil-relay pair of lenses.

10. A method according to claim 8, comprising monitoring for light subsequent to a helical scan and operating the focussing means in accordance with the results of the monitoring step.

11. A method according to claim 8 comprising providing an air bearing intermediate the drum and the portion of tape material at the wrapping location.

12. A method according to claim 8 comprising tracking, at the drum, the light for scanning of the portion of tape material at the wrapping location.

13. A method according to claim 8 comprising providing a plurality of light beams to effect the writing of indicia designating data onto the tape material and/or means providing a plurality of light beams to effect the reading of indicia designating data on the tape material, and effecting relative rotation of the light beams about an axis parallel to their path, the rotation being effected in the light path intermediate the light supply means and the drum and having a rate of rotation in dependence on that of the drum.

* * * * *